United States Patent
Roberge et al.

(10) Patent No.: US 10,123,524 B2
(45) Date of Patent: Nov. 13, 2018

(54) ACTIVE SYSTEM FOR OPTIMIZATION AND PLUGGING AVOIDANCE OF SEED/FERTILIZER IN TRANSPORT CONDUCTS

(71) Applicant: CNH Industrial Canada, Ltd., Saskatoon (CA)

(72) Inventors: Martin J. Roberge, Saskatoon (CA); Rex L. Ruppert, Benson, MN (US); Bradley D. Hansen, Montevideo, MN (US)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 630 days.

(21) Appl. No.: 14/309,102

(22) Filed: Jun. 19, 2014

(65) Prior Publication Data

US 2015/0366127 A1    Dec. 24, 2015

(51) Int. Cl.
*A01C 7/08* (2006.01)
*A01M 7/00* (2006.01)
*A01C 15/04* (2006.01)

(52) U.S. Cl.
CPC ............... *A01M 7/00* (2013.01); *A01C 7/081* (2013.01); *A01C 15/04* (2013.01); *A01M 7/0003* (2013.01)

(58) Field of Classification Search
CPC ............ A01C 7/081; A01C 15/04; A01C 7/08–7/088; A01C 7/102; A01C 7/105; A01C 7/082; A01C 15/00; A01C 21/00; A01C 23/007; A01C 7/107; A01M 7/0092; A01M 7/00; A01B 76/00; A01B 79/005; Y02P 60/16

USPC .................................................. 239/159–170
See application file for complete search history.

(56) References Cited

U.S. PATENT DOCUMENTS

| 3,482,735 A | 12/1969 | Goulter |
| 3,985,263 A | 10/1976 | Rohrbach et al. |
| 5,260,875 A | 11/1993 | Tofte et al. |
| 5,485,962 A * | 1/1996 | Moss ................. A01C 15/04 239/655 |

(Continued)

OTHER PUBLICATIONS

A brochure entitled "Safeguard Blockage Monitor", Micro-Trak Systems, Inc., Eagle Lake, MN (4 pages).

*Primary Examiner* — Steven J Ganey
*Assistant Examiner* — Juan C Barrera
(74) *Attorney, Agent, or Firm* — Rebecca L. Henkel; Rickard K. DeMille

(57) ABSTRACT

An agricultural implement has a product supply chamber, and a pair of transversely extending product delivering booms, each with a plurality of conduits of varying lengths terminating in product distributing nozzles. A fan supplies air to a mixing chamber which also receives product from the supply chamber providing an air entrained flow of product to each conduit. A controller monitors product delivery and controls implement operation. Each conduit has a pressure tap near the nozzle for providing the controller with a pressure differential indication. The controller initiates a corrective action modifying the operation of the delivery system when a predetermined pressure differential threshold is exceeded. The corrective action may include an increased air flow volume, an additional burst of higher pressure air into the conduit, a temporary increase in air flow from the air flow source, or a reduction in the rate of product flow from the supply chamber.

11 Claims, 6 Drawing Sheets

(56) References Cited

U.S. PATENT DOCUMENTS

| | | | |
|---|---|---|---|
| 5,601,209 A | 2/1997 | Barsi et al. | |
| 5,765,492 A | 6/1998 | Sirkkala | |
| 5,831,542 A * | 11/1998 | Thomas | A01C 7/105 |
| | | | 310/345 |
| 6,164,560 A | 12/2000 | Lehrke et al. | |
| 6,644,225 B2 | 11/2003 | Keaton | |
| 6,935,256 B1 | 8/2005 | Meyer | |
| 7,140,310 B2 * | 11/2006 | Mayerle | A01C 7/06 |
| | | | 111/175 |
| 7,490,563 B2 | 2/2009 | Eastin et al. | |
| 7,490,565 B2 | 2/2009 | Holly | |
| 8,350,689 B2 * | 1/2013 | Mariman | A01C 7/082 |
| | | | 340/451 |
| 8,504,310 B2 * | 8/2013 | Landphair | A01C 7/081 |
| | | | 702/45 |
| 8,651,927 B1 | 2/2014 | Roberge et al. | |
| 2010/0282141 A1 | 11/2010 | Wollenhaupt et al. | |
| 2010/0313801 A1 * | 12/2010 | Peterson | A01C 7/102 |
| | | | 111/130 |
| 2012/0227647 A1 * | 9/2012 | Gelinske | G01F 1/666 |
| | | | 111/174 |
| 2012/0316736 A1 * | 12/2012 | Hubalek | A01B 79/005 |
| | | | 701/50 |
| 2013/0061790 A1 * | 3/2013 | Binsirawanich | A01C 7/081 |
| | | | 111/174 |
| 2013/0211628 A1 * | 8/2013 | Thurow | G06F 17/00 |
| | | | 701/2 |
| 2013/0294848 A1 | 11/2013 | Fulkerson et al. | |
| 2014/0049395 A1 * | 2/2014 | Hui | A01C 7/081 |
| | | | 340/608 |

\* cited by examiner

ACTIVE SYSTEM FOR OPTIMIZATION AND PLUGGING AVOIDANCE OF SEED/FERTILIZER IN TRANSPORT CONDUCTS

BACKGROUND OF THE INVENTION

1. Field of the Invention

The present invention relates generally to agricultural equipment, and, more particularly to an agricultural product delivery system for an agricultural product such as seed, herbicide, insecticide and/or fertilizer entrained in an air stream, and to a method for equipment operation at near maximum product delivery rate while minimizing the likelihood of delivery system blockage.

2. Description of the Related Art

Pneumatic agricultural product delivery systems utilize a flow of air to assist in the delivery and movement of particulate material or product such as fertilizer, seed, insecticide or herbicide from a product supply chamber to a growing medium, such as soil. Such pneumatic agricultural particulate material delivery systems are commonly employed in planters, air drills and a variety of other agricultural implements. Special purpose implements such as fertilizer application equipment, planters or air seeders may also employ pneumatic delivery systems. Known pneumatic agricultural product delivery systems typically use air in motion to transport the product through an interior passage provided by a series of elongate tubes which extend from the product supply chamber or hopper to an outlet adjacent to the soil. Various conditions may lead to product blockage in the tubes resulting in lost time and effort to remove the blockage and resume the agricultural process.

What is needed in the art is an air distribution system which minimizes blockage problems and can allow the equipment to run at near maximum delivery capacity.

SUMMARY OF THE INVENTION

The present invention provides an agricultural product air distribution system which minimizes the likelihood of product blockage while maintaining product flow rate near maximum.

The invention in one form is directed to an agricultural implement for pneumatically distributing an agricultural particulate material, such as a fertilizer or seeds, as part of a crop production process. The implement has a transport unit movable on an agricultural field in a longitudinal direction and supporting a product supply chamber. There is a pair of product delivering booms extendable transversely to either side, each including a plurality of transversely extending conduits (conducts or tubes) of varying lengths terminating in product distributing outlet nozzles. A mixing chamber receives air from an air flow source (fan) and product from the supply chamber to provide an air entrained flow of particles to each transversely extending conduit. A controller monitors product delivery and controls implement operation. Each conduit includes a pressure tap near the outlet nozzle for providing the controller with a pressure differential indication for the conduit. The controller initiates a corrective action modifying the operation of the implement when a predetermined pressure differential threshold indicative of imminent conduit blockage is reached. The corrective action may be a slowing of the ground speed of the transport unit by reducing engine speed or varying the implement transmission ratio either manually or using a specified protocol (ISOBUS protocol for example). The corrective action may also be an increase in the air flow volume (volume per unit time or air mass flow rate) from the air flow source (fan), introduction of an additional burst of compressed air into the conduit near the mixing chamber (various pressure variation patterns are possible), or a temporary increase in air flow from the air flow source.

The invention in another form is directed to a process of monitoring an air/particle mixture movement through an elongated agricultural product delivery system conduit to optimize the rate of product delivery. The process includes measuring the pressure differential along the conduit and comparing that measured pressure differential with a predetermined threshold pressure differential. A corrective action is initiated when the comparison indicates imminent conduit blockage. The corrective action modifies the delivery system operation by reducing the rate of agricultural product flow through the conduit or temporarily augmenting the air flow in the conduit. The corrective action maintains product flow near maximum at all times without allowing the conduit to become blocked.

An advantage of the present invention is reduced downtime due to product clogging in delivery tubes.

Another advantage is maintenance of a near maximum product flow rate while distributing product.

Yet another advantage is optimum utilization of an agricultural implement having an air product distribution system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
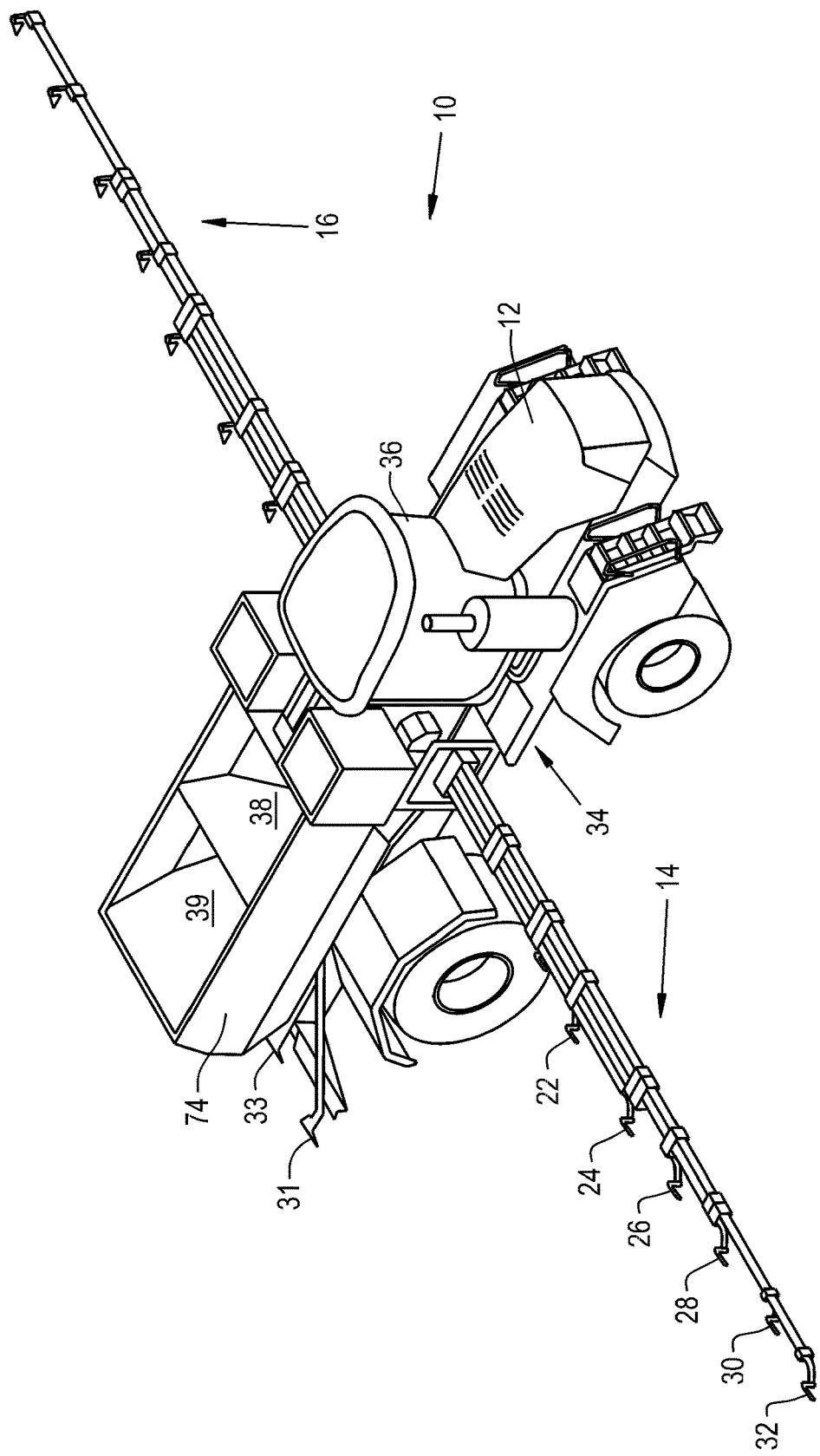
FIG. 1 is an isometric view of an air spreader system for agricultural products such as fertilizer incorporating the invention in one form.
Figure 2:
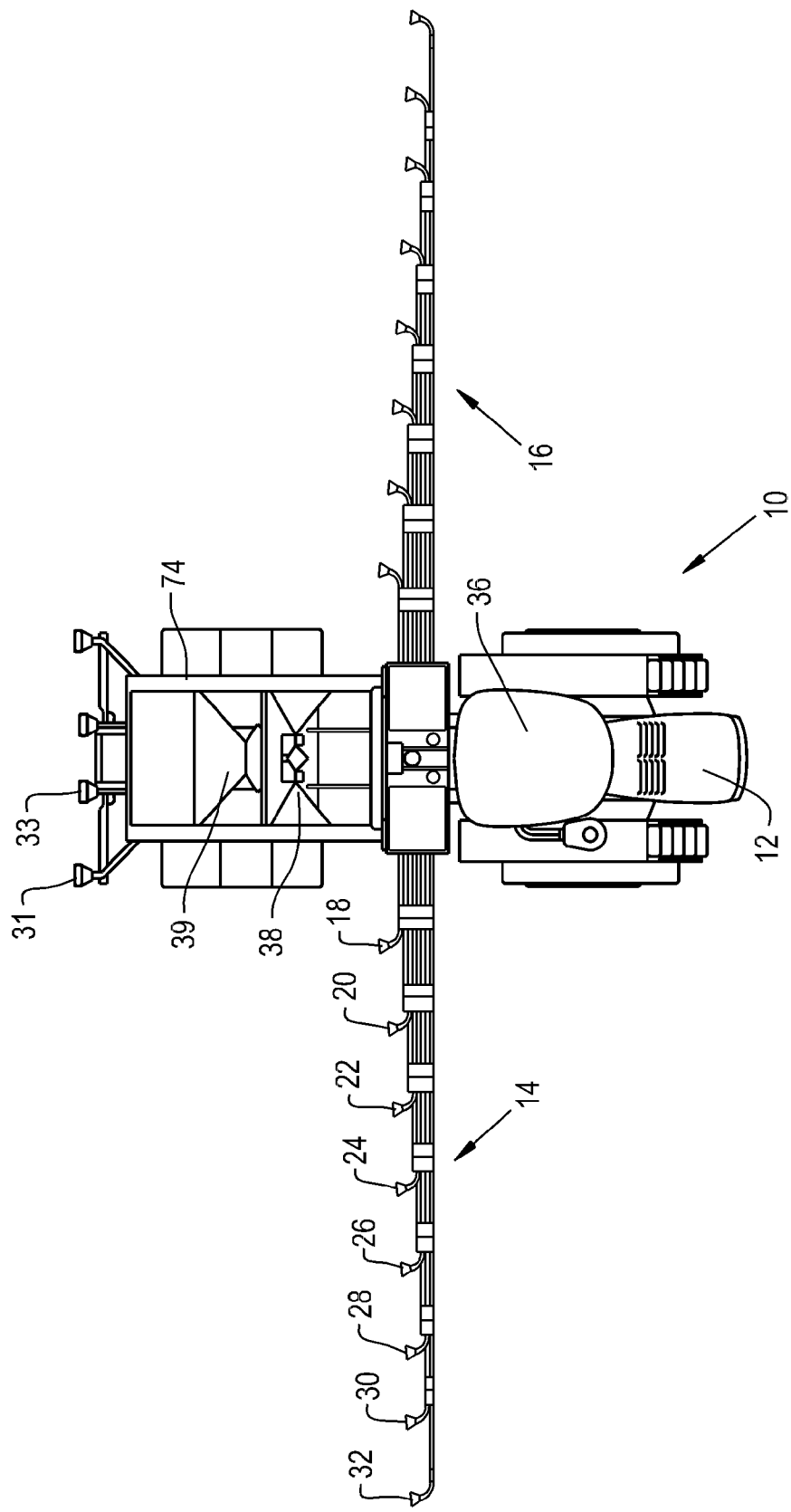
FIG. 2 is a top view of the air spreading system of FIG. 1.

Referring now to the drawings, and more particularly to FIGS. 1 and 2, there is shown an agricultural implement 10 such as an air fertilizer spreader which generally includes a large tired transport unit such as truck or tractor, self propelled by an engine within the engine compartment 12, and having a pair of laterally extending particle delivery booms 14 and 16. As is known in the art, these booms may be pivotable to a stowed position close to the implement for storage or transport. Each boom includes a plurality of boom tubes or conducts terminating at the outboard end in a fertilizer spreading outlet or nozzle 18-32. Additionally, there are rear nozzles such as 31 and 33. The implement transport unit 34 includes an operator cab 36 and a pair of hopper compartments 38 and 39. The fertilizer spreader of FIGS. 1 and 2 is illustrative and the invention may, of course, be employed in conjunction with other agricultural equipment such as tilling or planting devices and is useful in distributing particulate material other than fertilizer.

Figure 3:
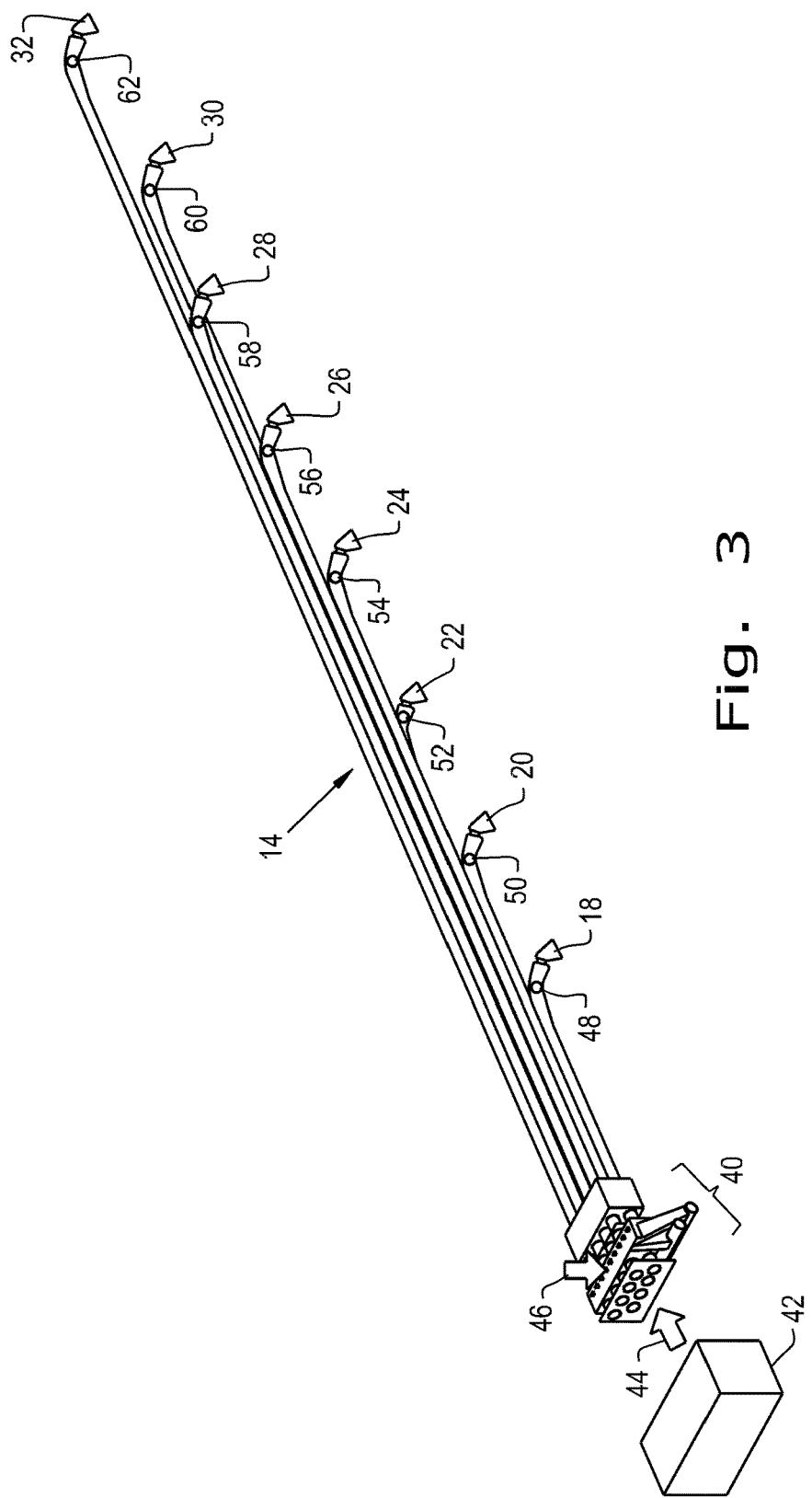
FIG. 3 is an isometric view of the right boom of FIGS. 1 and 2.

FIG. 3 shows the right (from the operator's viewpoint) boom 14 in greater detail. It will be understood that the left boom 16 may be a mirror image thereof. The inboard end of the boom includes a mixing chamber such as venturi box 40 which receives from an air flow source, such as a fan 42, an input air flow 44 to be mixed with a metered flow 46 of fertilizer or other particulate material from a drop chute. Additional air flow from a compressor may be introduced automatically or under operator control. The air and entrained particles are forced under air pressure down the individual boom tubes and from the nozzles onto the agricultural field surface. Each boom tube or conduit includes an outlet pressure tap 48-62 for providing an indication of the air pressure at that individual outlet to the control system. A similar upstream pressure tap 64 provides an indication of conduit inlet pressure which may be considered as common to all the boom tubes or each individual tube may have its own inlet pressure tap.

Figure 4:
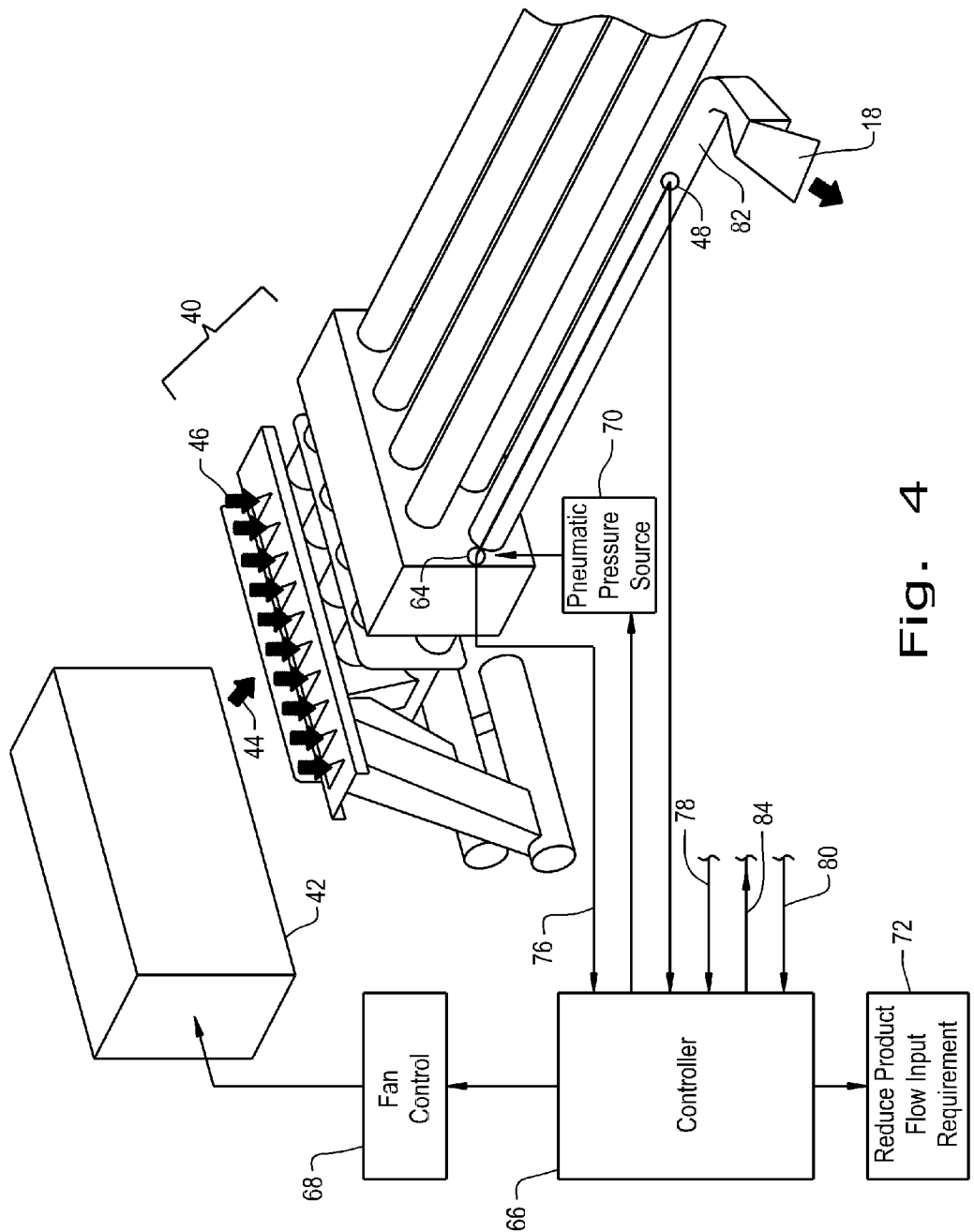
FIG. 4 is an isometric view of a portion of the boom of FIGS. 1-3 from a different orientation including schematic controls.

As shown in FIG. 4, air inlet pressure tap 64 and outlet tap 48 are coupled to a controller 66. Each pressure tap may include a transducer for providing and electrical pressure indicative output to the controller, or air passageways from respective inlet and outlet taps may be coupled to a pressure differential measuring device which, in turn, feeds pressure differential information to the controller. The controller 66 provides outputs to the fan control 68, the pneumatic pressure source 70 and to a mechanism 72 for temporarily reducing the particle flow 46 requirements from the hopper 74. The pneumatic pressure source 70, such as a compressor with a conventional pressure tank or accumulator, is normally inactive, but may be energized to provide a temporary burst of air into the conduit near the conduit inlet and directed somewhat downstream when the pressure differential between the taps 48 and 64 indicates incipient conduit blockage. This pneumatic source may derive air pressure from air source (fan) 42 or may comprise an independent unit. The controller 66 may utilize a common inlet pressure indication on line 76 or may receive individual conduit inlet pressure information as indicated generally at 78, however, individual outlet pressure information for each conduit as indicated at 80 is desirable. Typically, pneumatic source 70 is dedicated to conduit 82 with the other conduits receiving air bursts from further pneumatic pressure sources as triggered by signals on additional controller output lines indicated generally at 84. The pneumatic source may be common to several or all conduits, in which case, those conduits will all receive a corrective burst of air.

In a preferred embodiment, the system has both a fan and an air compressor. The pneumatic source (air compressor) 70 produces an air flow at a higher pressure than the fan 42. The fan runs continuously and the air boost from the compressor air accumulator runs on demand at near plugging conditions using various air pressure patterns. The system can also speed up the fan to provide in general a larger air flow rate, but the response time is slower than with the compressed air to break up a wad of near-stopped particles.

Figure 5:
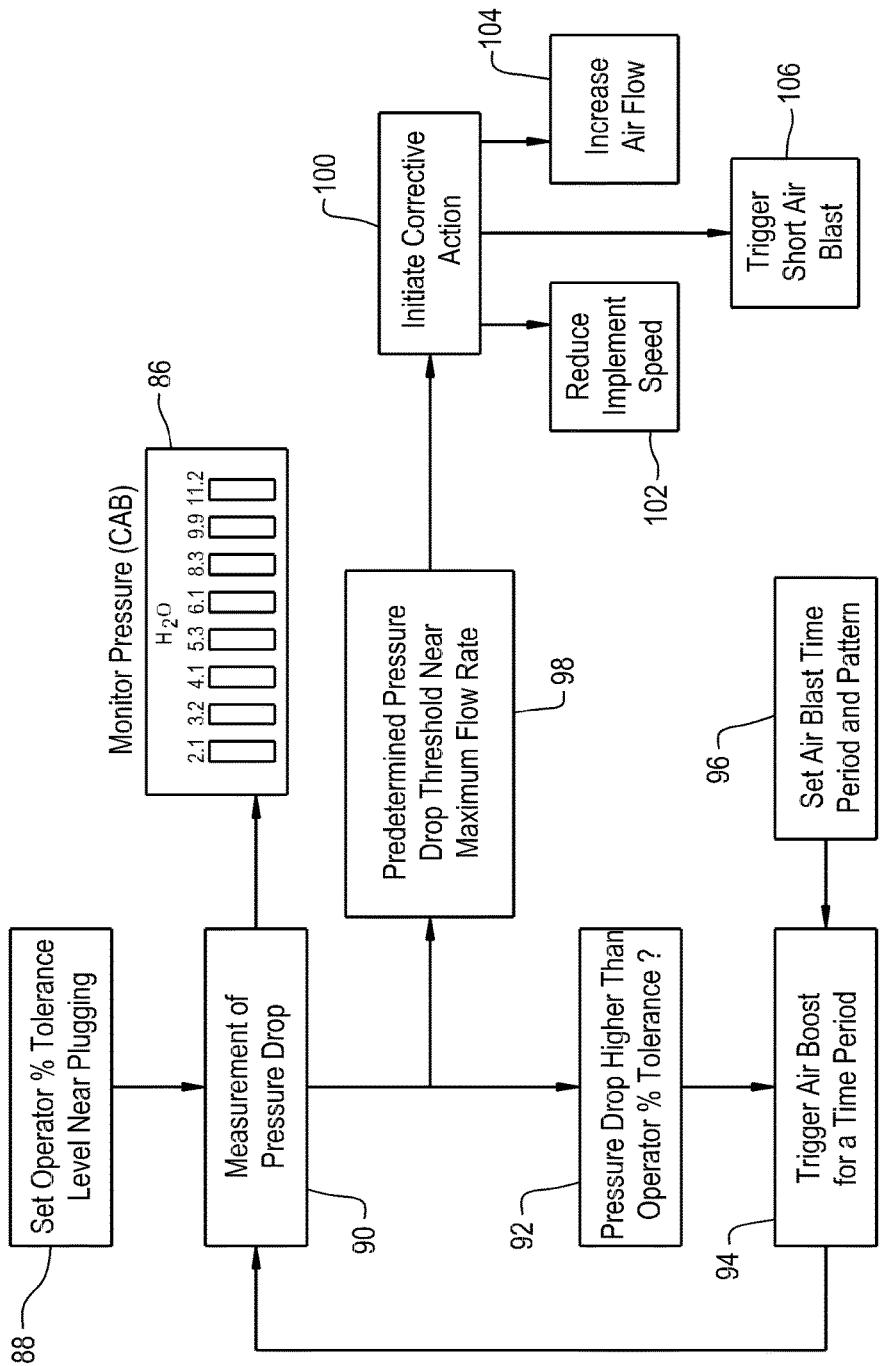
FIG. 5 is a schematic illustration of the operation of the system of FIG. 4.

The controller 66 operation is summarized in FIG. 5. The controller monitors static pressure in each tube or conduit and provides the operator with an indication thereof on in-cab display 86 that shows the air pressure drop (for example, in inches of $H_2O$). The operator typically sets a plugging level and a level of tolerance percentage at 88 and when the measured pressure drop (pressure differential) 90 exceeds the set values, command 92 initiates the triggering 94 of pneumatic pressure source for the offending conduit. Various patterns for the air blast may be operator set as shown at 96.

Figure 6A:
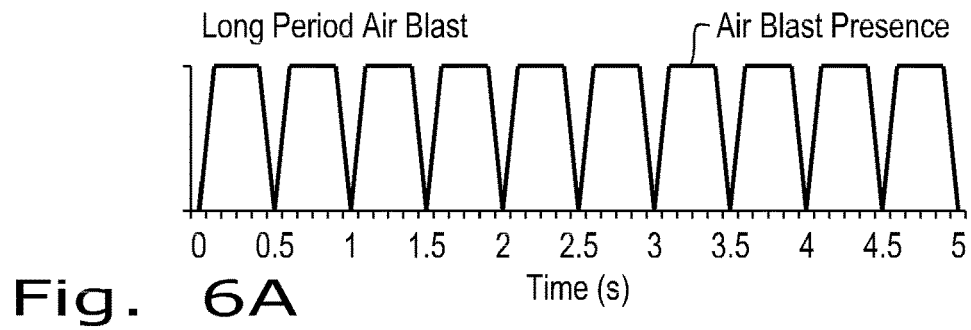
FIGS. 6A through 6D are graphs of exemplary air blast profiles for a pneumatic product delivery system.
Figure 6B:
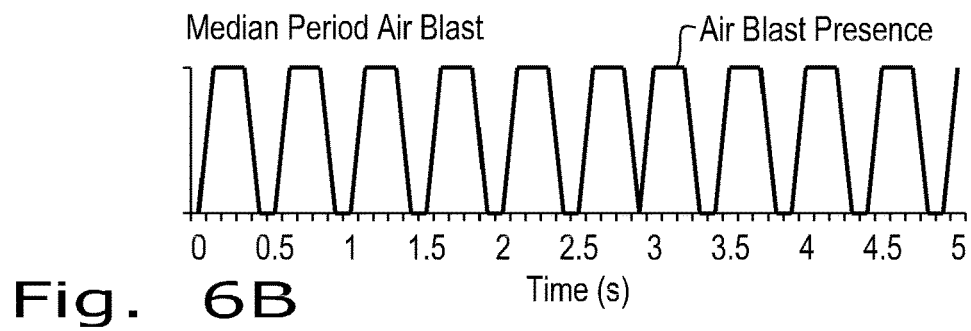
Figure 6C:
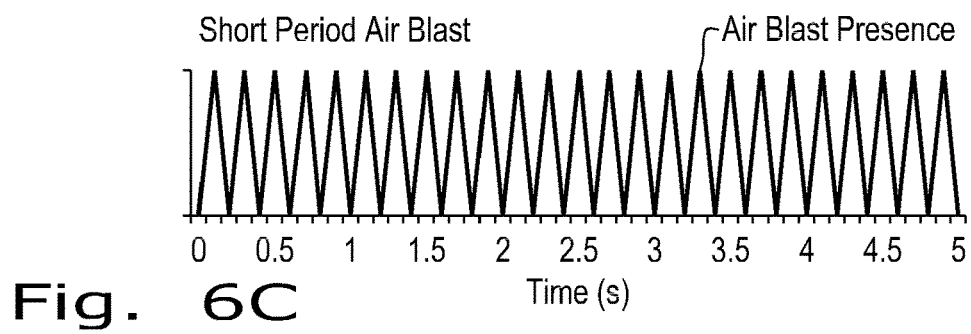
Figure 6D:
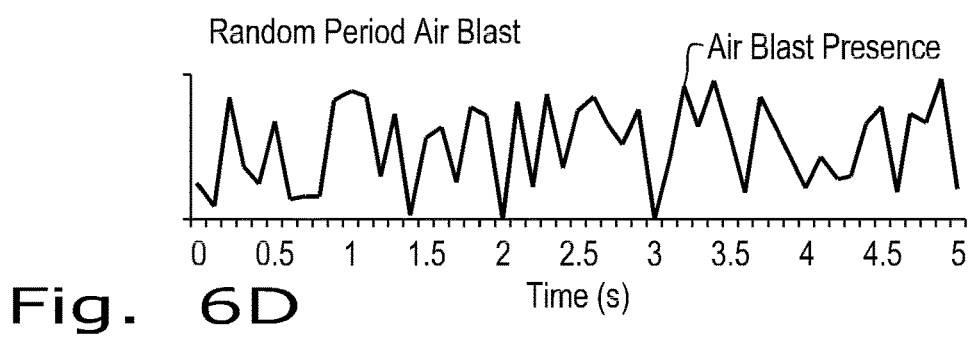

Exemplary air blast patterns are shown in FIGS. 6A-6D. The blasts are shown as lasting 5 seconds, however, other blast durations may be employed. FIG. 6A illustrates a blast having a relatively long period of one-half second. FIG. 6C shows a more staccato-like repetition rate about double that shown in FIG. 6A. A repetition rate intermediate those of FIGS. 6A and 6C is shown in FIG. 6B while a pattern random in both repetition rate and amplitude is shown in FIG. 6D. Other patterns and rates are clearly possible. Air blast patterns of a similar nature are disclosed in the Roberge et al U.S. Pat. No. 8,651,927 B1. In this patented arrangement, the air blasts are employed as part of an improved combine harvester separating and cleaning system. The avoidance of resonance and shock waves in the conduits is an advantage of the random air blast pattern.

The controller 66 is further operative to optimize the rate of product delivery by measuring 90 the pressure differential along the conduit and comparing 98 the measured pressure differential to a predetermined threshold pressure differential. When that threshold is reached indicating imminent conduit blockage, a corrective action 100 is initiated. The corrective action comprises modifying the delivery system operation by any suitable technique as by reducing the rate of agricultural product flow through the conduit, for example, by reducing the implement ground speed 102. Implement ground speed may be reduced by slowing the engine 12, or by varying the implement or traction unit transmission ratio either manually or utilizing any suitable protocol like ISOBUS. The corrective action may also include temporarily augmenting the air flow in the conduit as by increasing air flow 104 from the fan 42, or providing a short air blast 106 from pneumatic source 70. The fan 42 may temporarily provide the function of pneumatic pressure source 70 employing one or more solenoids to release air into all or selected ones of the air boosters, but an air compressor is preferred for its quick response time. The corrective action is intended to maintain product flow near maximum at all times without allowing the conduit to become blocked.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement for distributing an agricultural particulate material as part of a crop production process having a pneumatic product delivery system, the agricultural implement comprising: a transport unit movable on an agricultural field in a longitudinal direction; at least one product supply chamber supported on and movable with the transport unit; a pair of product delivering booms extendable transversely, one to each unit side, each boom including a plurality of transversely extending conduits of varying lengths terminating in a product distributing outlet nozzle; an air flow source; a mixing chamber for receiving air from the air flow source and product from the supply chamber to provide an air entrained flow of particles to each transversely extending conduit; a pneumatic pressure source in fluid communication with at least one conduit of the plurality of conduits at a location downstream of the mixing chamber; a controller for monitoring product delivery and controlling implement operation; at least one inlet pressure tap for determining a first pressure in at least one of the plurality of conduits; each conduit including an outlet pressure tap providing the controller with a pressure differential indication for the conduit based on the first pressure at the at least one inlet pressure tap and a second pressure at the outlet pressure tap; and the controller initiating a corrective action based on the pressure differential indication to slow the ground speed of the implement when a predetermined pressure differential threshold indicative of imminent conduit blockage in one or more conduits is reached.

2. The agricultural implement of claim 1, wherein the ground speed of the transport unit is slowed by reducing engine speed.

3. The agricultural implement of claim 1, wherein the ground speed of the transport unit is slowed by varying the implement transmission ratio.

4. The agricultural implement of claim 1, wherein the particulate material is a fertilizer.

5. The agricultural implement of claim 1, wherein the particulate material is seeds.

6. An agricultural implement pneumatic product delivery system, comprising; an implement supported product supply chamber; a pair of product delivering booms extendable transversely, one to each unit side, each boom including a plurality of transversely extending conduits of varying lengths, each conduit terminating in a product distributing outlet nozzle; an air flow source; and a mixing chamber for receiving air from the air flow source and product from the supply chamber to provide an air entrained flow of product particles to each transversely extending conduit; a pneumatic pressure source in fluid communication with at least one conduit of the plurality of conduits at a location downstream of the mixing chamber; a controller for monitoring product delivery and controlling implement operation; at least one inlet pressure tap for determining a first pressure in at least one of the plurality of conduits; each conduit including an outlet pressure tap providing the controller with a pressure differential indication for the conduit based on the first pressure at the at least one inlet pressure tap and a second pressure at the outlet pressure tap; and the controller initiating a corrective action based on the pressure differential indication to slow the ground speed of the implement when a predetermined pressure differential threshold in one or more conduit is reached.

7. The pneumatic product delivery system of claim 6, wherein the ground speed of the transport unit is slowed by reducing engine speed.

8. The pneumatic product delivery system of claim 6, wherein the ground speed of the transport unit is slowed by varying the implement transmission ratio.

9. An agricultural implement pneumatic product delivery system, comprising: a plurality of transversely extending conduits; an air flow source; a product supply chamber; a mixing chamber for receiving air from the air flow source and product from the supply chamber to provide an air entrained flow of particles to each transversely extending conduit; a pneumatic pressure source in fluid communication with at least one conduit of the plurality of conduits at a location downstream of the mixing chamber; a controller for monitoring product delivery through the plurality of conduits; the controller being configured to initiate a corrective action to slow the ground speed of an associated implement when a predetermined pressure differential threshold indicative of imminent conduit blockage is reached, wherein the pressure differential is measured with at least one inlet pressure tap and at least one outlet pressure tap located in at least one of said conduits.

10. The agricultural implement pneumatic product delivery system of claim 9, wherein the ground speed of the transport unit is slowed by reducing engine speed.

11. The agricultural implement pneumatic product delivery system of claim 9, wherein the ground speed of the transport unit is slowed by varying the implement transmission ratio.

* * * * *